United States Patent
Becker

(10) Patent No.: US 9,500,736 B2
(45) Date of Patent: Nov. 22, 2016

(54) SYSTEM AND METHOD FOR PROVIDING SELF-LOCATING WIRELESS SENSORS

(75) Inventor: Jeffrey M. Becker, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 1258 days.

(21) Appl. No.: 12/183,263

(22) Filed: Jul. 31, 2008

(65) Prior Publication Data

US 2010/0026514 A1 Feb. 4, 2010

(51) Int. Cl.
| | |
|---|---|
| *G08B 1/08* | (2006.01) |
| *G01S 5/00* | (2006.01) |
| *G01D 21/00* | (2006.01) |
| *H04W 24/00* | (2009.01) |
| *G01S 5/02* | (2010.01) |
| *G01S 19/38* | (2010.01) |

(52) U.S. Cl.
CPC .............. *G01S 5/0027* (2013.01); *G01D 21/00* (2013.01); *G01S 5/02* (2013.01); *H04W 24/00* (2013.01); *G01S 19/38* (2013.01)

(58) Field of Classification Search
CPC ........ G01S 19/38; G01S 5/0027; G01S 5/02; G01S 5/0009; G01S 5/0268; G01S 13/878; G01S 2013/466; G01S 2013/468; H04W 24/00; H04W 16/14; H04W 84/18; H04W 92/02; H04W 64/00; G01C 21/16; G06F 1/3206; G06F 2200/1637; G05B 2219/33192; H04L 63/10
USPC ............. 340/539.15, 572.1, 539.32, 539.13, 340/539.18, 10.2, 539.1, 531, 573.1, 573.3, 340/573.4, 10.3, 10.32, 10.1, 870.01; 455/456.5, 456.1, 456.2, 456.3, 456.4, 455/404.2, 11.1, 12.1, 13.1, 13.4; 370/314, 370/442, 310, 310.2, 395.52, 428, 521, 370/317–319, 324, 328, 351–356, 389
See application file for complete search history.

(56) References Cited

U.S. PATENT DOCUMENTS

| | | |
|---|---|---|
| 5,051,741 A | 9/1991 | Wesby |
| 5,129,605 A | 7/1992 | Burns et al. |
| 6,021,330 A | 2/2000 | Vannucci |
| 6,034,603 A | 3/2000 | Steeves |
| 6,255,988 B1 | 7/2001 | Bischoff |
| 6,363,323 B1 | 3/2002 | Jones |
| 6,473,038 B2 | 10/2002 | Patwari et al. |

(Continued)

OTHER PUBLICATIONS

"IntelaTrac PKS Redefines Field Data Collection and Management," Honeywell, Feb. 2006, 2 pages.

(Continued)

*Primary Examiner* — Mirza Alam

(57) ABSTRACT

A wireless sensor network is disclosed that comprises a plurality of wireless sensors and a wireless sensor base station. The wireless sensor base station sends a request to one of the wireless sensors requesting the location information for the selected wireless sensor. The wireless sensor determines its location using a location information determination method, associates its identity information with the location information, and sends the identity information and the location information to the wireless sensor base station. The wireless sensor continuously sends updated location information to the wireless sensor base station as the wireless sensor moves within the wireless sensor network. The wireless sensor base station displays the identity information and the location information of the wireless sensor on a display unit.

24 Claims, 11 Drawing Sheets

(56) References Cited

U.S. PATENT DOCUMENTS

| | | |
|---|---|---|
| 6,570,487 B1 | 5/2003 | Steeves |
| 6,850,502 B1 | 2/2005 | Kagan et al. |
| 6,961,541 B2 | 11/2005 | Overy et al. |
| 7,005,985 B1 | 2/2006 | Steeves |
| 7,027,416 B1 | 4/2006 | Kriz |
| 7,286,158 B1 | 10/2007 | Griebenow |
| 7,379,729 B2 * | 5/2008 | Holland et al. ............ 455/404.2 |
| 7,518,499 B2 * | 4/2009 | Werenka ...................... 340/506 |
| 7,640,007 B2 | 12/2009 | Chen et al. |
| 7,853,250 B2 | 12/2010 | Harvey et al. |
| 8,223,012 B1 | 7/2012 | Diem |
| 2004/0029558 A1 * | 2/2004 | Liu ............................ 455/404.2 |
| 2005/0128074 A1 | 6/2005 | Culpepper et al. |
| 2005/0201349 A1 | 9/2005 | Budampati |
| 2005/0281215 A1 | 12/2005 | Budampati et al. |
| 2006/0002368 A1 | 1/2006 | Budampati et al. |
| 2006/0046664 A1 * | 3/2006 | Paradiso ............. G08B 25/009 455/96 |
| 2006/0063523 A1 | 3/2006 | McFarland |
| 2006/0143292 A1 | 6/2006 | Taubenheim et al. |
| 2006/0171344 A1 | 8/2006 | Subramanian et al. |
| 2006/0171346 A1 | 8/2006 | Kolavennu et al. |
| 2006/0176169 A1 * | 8/2006 | Doolin ................... G08B 17/00 340/521 |
| 2006/0205417 A1 | 9/2006 | Ju et al. |
| 2006/0227729 A1 | 10/2006 | Budampati et al. |
| 2006/0261940 A1 * | 11/2006 | Defant et al. ............ 340/539.13 |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0037588 A1 * | 2/2007 | Mohi ...................... G01C 21/20 455/456.5 |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0132576 A1 | 6/2007 | Kolavennu et al. |
| 2007/0132577 A1 | 6/2007 | Kolavennu |
| 2007/0132637 A1 | 6/2007 | Kolavennu et al. |
| 2007/0155401 A1 | 7/2007 | Ward et al. |
| 2007/0155423 A1 * | 7/2007 | Carmody ................ H04L 69/18 455/556.1 |
| 2007/0167147 A1 * | 7/2007 | Krasner ............... G08B 25/009 455/404.2 |
| 2007/0205886 A1 | 9/2007 | Huseth et al. |
| 2007/0241901 A1 | 10/2007 | Cage et al. |
| 2007/0241965 A1 * | 10/2007 | Kolavennu et al. .......... 342/465 |
| 2007/0268884 A1 | 11/2007 | Kolavennu et al. |
| 2008/0076450 A1 * | 3/2008 | Nanda ................... G01D 21/00 455/456.1 |
| 2008/0109098 A1 | 5/2008 | Moshier et al. |
| 2008/0109099 A1 | 5/2008 | Moshier |
| 2008/0122641 A1 | 5/2008 | Amidi |
| 2008/0123934 A1 | 5/2008 | Amidi |
| 2008/0209521 A1 | 8/2008 | Malaney |
| 2008/0234935 A1 * | 9/2008 | Wolf ...................... G01C 21/16 701/472 |
| 2008/0267259 A1 | 10/2008 | Budampati et al. |
| 2008/0273547 A1 | 11/2008 | Phinney |
| 2009/0009327 A1 | 1/2009 | Amidi |
| 2009/0010484 A1 | 1/2009 | Amidi |
| 2009/0021390 A1 | 1/2009 | Amidi |
| 2009/0115604 A1 * | 5/2009 | Thomas ................. F24F 11/001 340/540 |
| 2009/0176507 A1 | 7/2009 | Wu et al. |

OTHER PUBLICATIONS

Honeywell Process Solutions, "IntelaTrac PKS," Honeywell, 2 pages.
"Powerful Calibration Management with DocuMint," Honeywell, Mar. 2008, 4 pages.
"Lumidor Minimax XT," Honeywell, Dec. 2005, 4 pages.
"PanOS Platform, Unified Location Management Platform," PanGo, 2007, 2 pages.
"Ekahau T301-A Wi-Fi Tag," ekahau, 2007, 2 pages.
"Improve Maintenance Efforts with DocuMint," Honeywell, Feb. 2006, 3 pages.
Honeywell Process Solutions, "Mobile Station," Honeywell, 3 pages.
"WiMAX", http://en.wikipedia.org/wiki/Wimax, Aug. 20, 2008, 17 pages.
Dongyan Chen et al., "Dependability Enhancement for IEEE 802.11 Wireless LAN with Redundancy Techniques," Proceedings of the 2003 International Conference on Dependable Systems and Networks, 2003, 8 pages.
Dr. Soumitri Kolavennu, Presentation, "WNSIA MAC Layer", ISA SP100 meeting, Feb. 14, 2007, 24 pages, see esp. p. 17.
Soroush Amidi, "System and Method for Inventory Management", U.S. Appl. No. 12/024,267, filed Feb. 1, 2008.
Soroush Amidi, "Method and Apparatus for Location Detection Using GPS and WIFI/WIMAX", U.S. Appl. No. 12/183,876, filed Jul. 31, 2008.
Soroush Amidi, "Method and Apparatus for Intermittent Location Reporting", U.S. Appl. No. 12/183,964, filed Jul. 31, 2008.
Goran M. Djuknic, et al., Geolocation and Assisted-GPS, White Paper, Mobility: 3G-CDMA2000 & UMTS, Lucent Technologies, Bell Labs, May 31, 2002, 10 pages.
Jean-Christophe Cousin, et al., "An Indoor Positioning System Using GPS Repeaters and AOA Measurements", 18th International Technical Meeting of the Satellite Division, Sep. 13-16, 2005, p. 2743-2749.

* cited by examiner

SYSTEM AND METHOD FOR PROVIDING SELF-LOCATING WIRELESS SENSORS

TECHNICAL FIELD OF THE INVENTION

The present invention is directed, in general, to a system and method for providing self-locating wireless sensors in a wireless sensor network.

BACKGROUND OF THE INVENTION

In the process control industry, process facilities (e.g., a manufacturing plant or crude oil refinery, etc.) may be managed using distributed control systems. Contemporary control systems include numerous models tailored to control or monitor various associated processes of the facility. Conventional means link these modules together to produce the distributed nature of the control system. This affords increased performance and a capability to expand or reduce the control system to satisfy changing facility needs.

Field instruments may be used to obtain sensor readings or measurements of a particular characteristic (e.g., temperature, pressure, flow, sound, light) that is needed in the control system. Many prior art field instruments are configured as wired field instruments. This means that the field instrument is connected to the control system by conventional wiring. A wired field instrument sends sensor information to the control system over a conventional wired interface (e.g., a two wire twisted pair current loop).

As wireless technology has continued to become more available, wireless field instruments have become more commonly used in control systems. A wireless field instrument comprises transceiver circuitry that is capable of wirelessly transmitting sensor information to the control system. A wireless network may comprise a plurality of wireless field instruments. For example, a wireless network may be used to wirelessly transmit sensor information from various wireless field instruments in the wireless network to a global controller of the control system. A wireless field instrument may also be referred to as a wireless sensor.

When a wired field instrument is installed its location is well known. The wiring for the wired field instrument is and documented in wiring diagrams that describe the wiring, the junction box or termination information, and the exact location of the wired filed instrument. The same is not necessarily true for wireless sensors.

One of the benefits of wireless sensors is that they can be quickly deployed. One drawback of using wireless sensors, however, is that the exact location of the wireless sensor may not be sufficiently well documented or, if initially well documented, may be subsequently lost. Wireless sensors can be easily moved. Therefore, even if the exact location of a wireless sensor is initially known, subsequent movement of the wireless sensor may cause the location information of the wireless sensor to be lost. When the location information of the wireless sensor is lost it is easy to accidentally link the wireless sensor to a wrong location.

Therefore, it would be desirable to have an efficient system and method for providing a self-locating wireless sensor that has the capability of determining its location information and providing its location information to other units in a wireless sensor network.

SUMMARY OF THE INVENTION

To address the above discussed deficiencies of the prior art, it is a primary object of the present invention to provide a system and method for providing a self-locating wireless sensor that has the capability of determining its location information and providing its location information to other units in a wireless sensor network.

One advantageous embodiment of the invention comprises a plurality of wireless sensors and a wireless sensor base station in a wireless sensor network. The wireless sensor base station sends a request to one of the plurality of wireless sensors requesting the location information for the selected wireless sensor. The wireless sensor determines its location using a location information determination method.

The wireless sensor then associates its identity information with the location information and sends the identity information and the location information to the wireless sensor base station. The wireless sensor continuously sends updated location information to the wireless sensor base station as the wireless sensor changes its location within the wireless sensor network. The wireless sensor base station displays the identity information and the location information of the wireless sensor on a display unit.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designated like objects, and in which.

DETAILED DESCRIPTION

FIGS. 1 through 11 and the various embodiments used to describe the principles of the present invention in this patent document are by way of illustration only and should not be construed in any way to limit the scope of the invention. Those skilled in the art will understand that the principles of the invention may be implemented in any type of suitably arranged wireless sensor.

Figure 1:
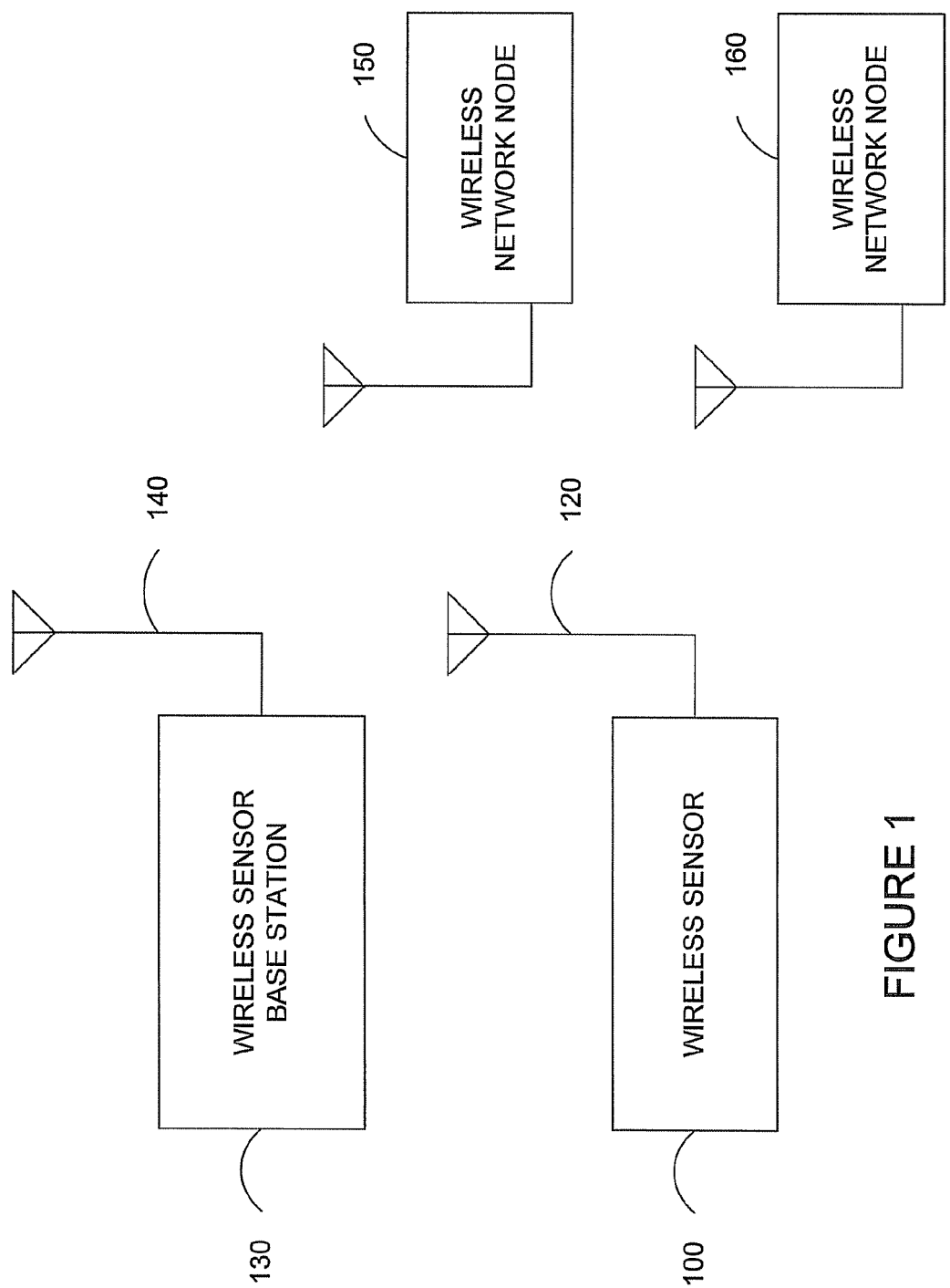
FIG. 1 illustrates a block diagram of an exemplary wireless sensor and an exemplary wireless sensor base station of the present invention in a wireless sensor network.

FIG. 1 illustrates a block diagram of a wireless sensor 100 of the present invention and a block diagram of a wireless sensor base station 130 of the present invention. The wireless sensor 100 comprises a wireless transceiver (not shown in FIG. 1) that allows the wireless sensor 100 to communicate through antenna 120. Similarly, the wireless sensor base station 130 comprises a wireless transceiver (not shown in FIG. 1) that allows the wireless sensor base station 130 to communicate through antenna 140.

The wireless sensor 100 is capable of transmitting wireless messages to the wireless sensor base station 130. The wireless sensor 100 is also capable of transmitting wireless messages to other wireless network nodes (such as wireless network nodes 150 and 160). The wireless sensor 100 is capable of receiving wireless messages from the wireless sensor base station 130. The wireless sensor 100 is also capable of receiving wireless messages from other wireless network nodes (such as wireless network nodes 150 and 160).

In some cases the wireless sensor 100 may not be able to communicate directly with the wireless sensor base station 130. For example, the distance between the wireless sensor 100 and the wireless sensor base station 130 may sometimes exceed the effective transmission range of the wireless sensor 100. In such cases it may be possible for the wireless sensor 100 to communicate with the wireless sensor base station 130 by relaying communications through one or more wireless network nodes (150 and/or 160) that are within range of the wireless sensor base station 130.

Figure 2:
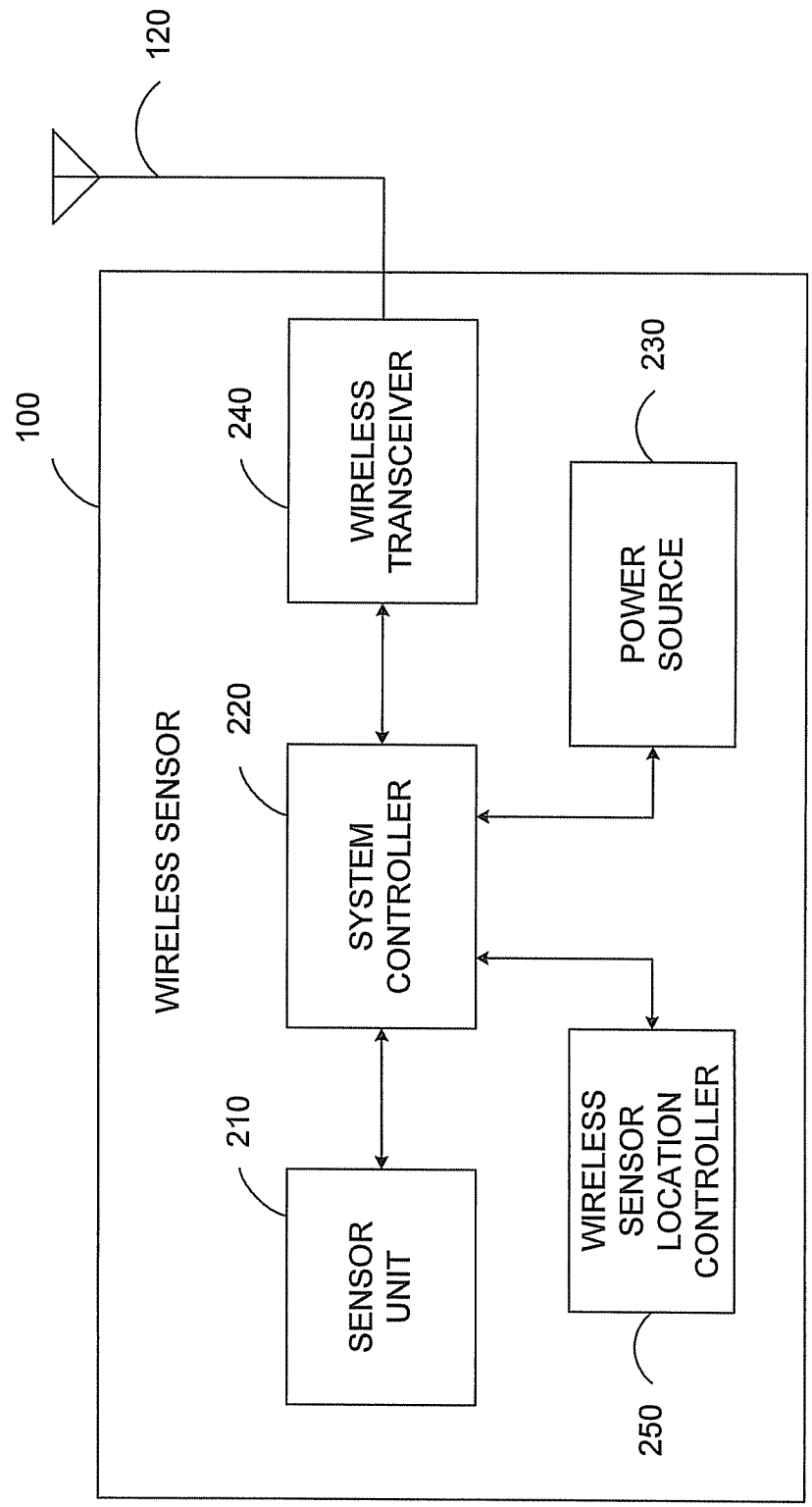
FIG. 2 illustrates a block diagram showing an exemplary wireless sensor of the present invention.

FIG. 2 illustrates a block diagram of an exemplary wireless sensor 100 of the present invention. Wireless sensor 100 comprises a sensor unit 210. The sensor unit 210 has individual sensors (not shown in FIG. 2) that obtain sensor readings or measurements of a desired characteristic (e.g., temperature, pressure, flow, sound, light). The sensor unit 210 provides a digital version of the sensor readings to a system controller 220 in the wireless sensor 100.

The system controller 220 is powered by a power source 230. The power source 230 can receive power from a battery power source (not shown in FIG. 2) or can receive power from another external power source (not shown in FIG. 2).

The system controller 220 is connected to a wireless transceiver 240. The wireless transceiver 240 is connected to an external antenna 120. The system controller 220 provides the digital version of the signals from the sensor unit 210 to the wireless transceiver 240 for transmission over antenna 120.

The wireless sensor 100 also comprises a wireless sensor location controller 250. As will be described below, the wireless sensor location controller 250 operates to determine the location information for the wireless sensor 100. When the wireless sensor 100 moves from a first location to a second location, the wireless sensor location controller 250 updates the location information for the wireless sensor 100.

The wireless sensor location controller 250 continuously automatically senses the location of the wireless sensor 100 and continuously records the location data of the wireless sensor 100 as the wireless sensor 100 moves. The location data of the wireless sensor 100 is stored in an electronic memory (not shown in FIG. 2). In response to an external request from the wireless sensor base station 130, the wireless sensor location controller 250 transmits the stored current value of location data for the wireless sensor 100 to the wireless sensor base station 130. Alternatively, the stored current value of location data for the wireless sensor 100 may be routinely transmitted back to the wireless sensor base station 130 on a periodic basis.

The wireless sensor location controller 250 is shown in FIG. 2 as a device that is separate from the system controller 220. In another embodiment of the invention, the wireless sensor location controller may be located within the system controller 220.

Figure 3:
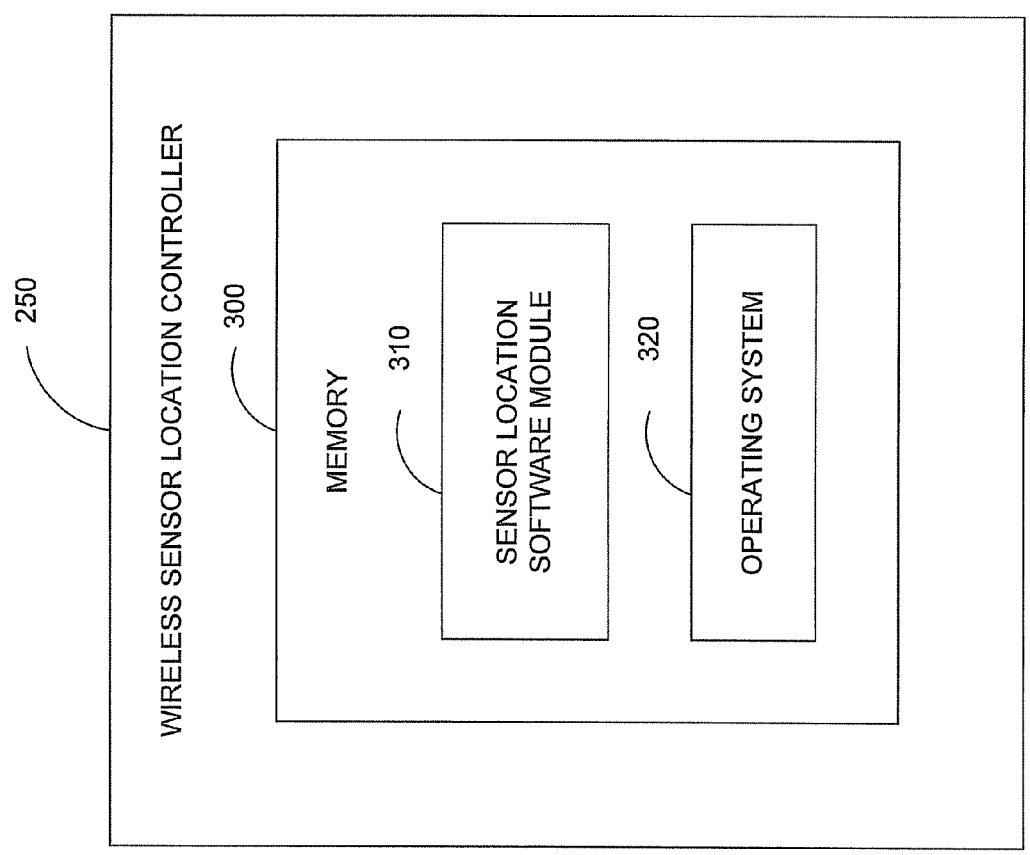
FIG. 3 illustrates a block diagram showing an exemplary wireless sensor location controller of the wireless sensor of the present invention.

FIG. 3 illustrates a block diagram showing in more detail an exemplary wireless sensor location controller 250 of the present invention. The wireless sensor location controller 250 comprises a computer memory unit 300. The computer memory unit 300 comprises a sensor location software module 310 and an operating system 320. The wireless sensor location controller 250 comprises computer hardware and computer software instructions that cooperate and work together to carry out the operations of the wireless sensor location controller 250. As previously mentioned, in one exemplary embodiment of the invention, the wireless sensor location controller may be located within the system controller 220.

The location of the wireless sensor 100 may be determined by several different methods. The approximate location of the wireless sensor 100 may be determined using an existing location technology such as the Global Positioning System ("GPS"). The wireless sensor location controller 250 can use GPS to continually update the location information of the wireless sensor 100 as the wireless sensor moves and changes its location. The wireless sensor location controller 250 can uniquely associate the GPS location information with the diagnostic information of the sensor unit 210 and the wireless sensor 100.

The approximate location of the wireless sensor 100 may also be determined using an existing location technology such as multilateration. Multilateration is a process that locates an object by accurately computing the time difference of arrival (TDOA) of a signal emitted from the object to three (or more) receivers.

Alternatively, the approximate location of the wireless sensor 100 may be determined using angle of arrival (AOA) measurements. AOA measurements are used to determine the direction of propagation of a radio frequency signal. The delay of arrival of a radio frequency signal at each element of an antenna array is measured directly and converted into an AOA measurement.

Alternatively, the approximate location of the wireless sensor 100 may be determined using signal strength measurements of a signal that is transmitted by the wireless sensor 100.

In one advantageous embodiment of the present invention the wireless sensor location controller 250 performs the calculations for the signal strength method/TDOA method/AOA method and transmits the calculations back to the wireless sensor base station 130.

The wireless sensor location controller 250 of the present invention may also provide a beacon signal that uniquely identifies the wireless sensor 100. The unique beacon signal that is associated with wireless sensor 100 can be transmitted by the wireless sensor 100 either in response to receiving a request from the wireless sensor base station 130, or in a transmission that is routinely transmitted back to the wireless sensor base station 130 on a periodic basis.

In another advantageous embodiment of the present invention the wireless sensor location controller 250 sends an "alert" signal to the wireless sensor base station 130 when a particular event of interest occurs with respect to the wireless sensor 100. For example, when the wireless sensor 100 moves past a predetermined geographical boundary, the wireless sensor location controller 250 senses that the geographical boundary has been crossed. The wireless sensor location controller 250 then causes an "alert" signal to be sent to the wireless sensor base station. For example, the "alert" signal may also be sent if the movement of the wireless sensor 100 exceeds a predetermined speed limit.

Figure 4:
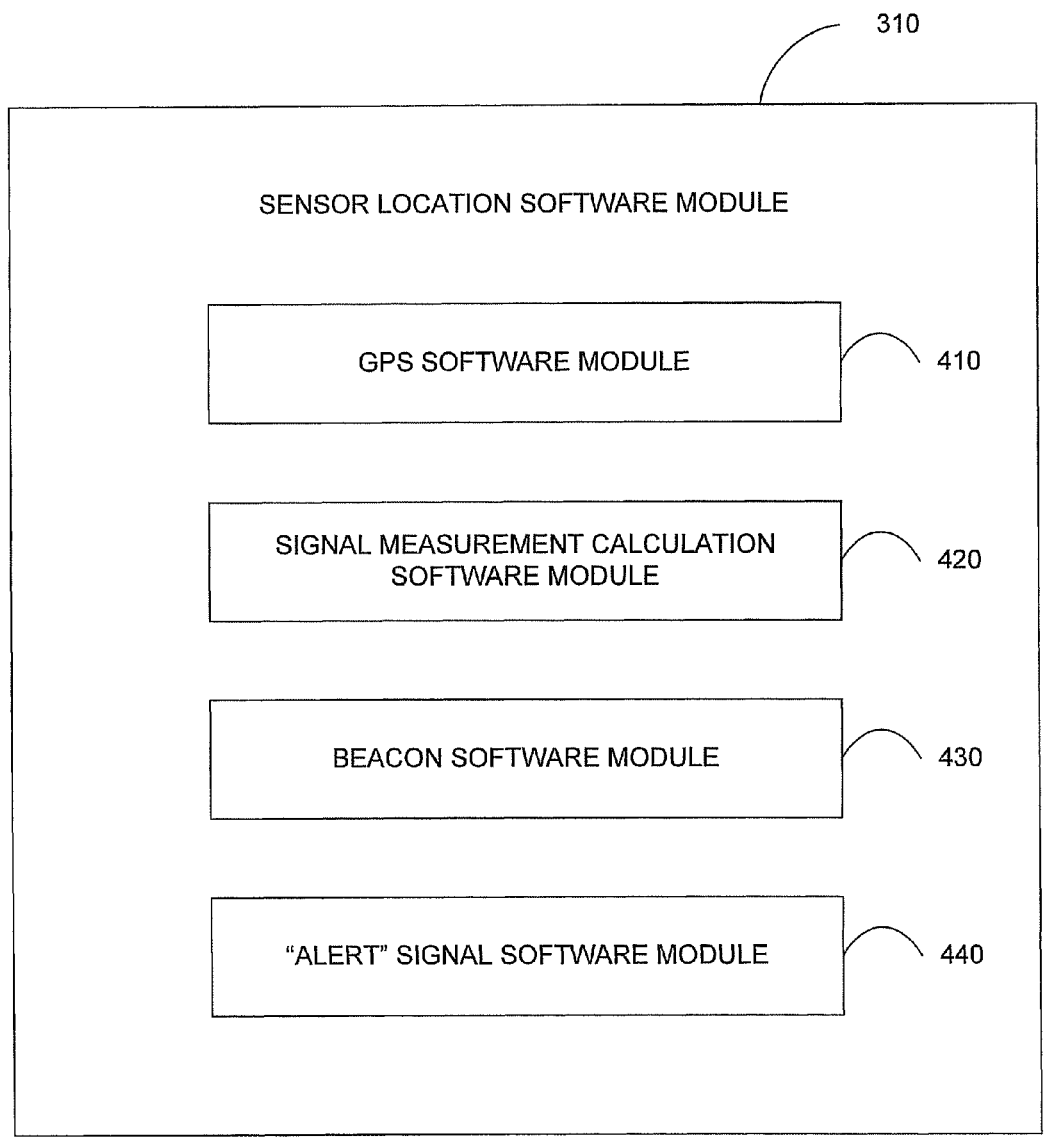
FIG. 4 illustrates a block diagram showing an exemplary sensor location software module of the wireless sensor of the present invention.

FIG. 4 illustrates a block diagram showing an exemplary sensor location software module 310 of the present invention. The exemplary sensor location software module 310 comprises a Global Positioning System ("GPS") software module 410. As previously described, wireless sensor location controller 250 can use GPS measurements to locate the wireless sensor 100. The exemplary sensor location software module 310 also comprises a signal measurement calculation software module 420. The wireless sensor location controller 250 can use the signal measurement calculation software module 420 to perform the calculations required for locating the wireless sensor 100 using signal strength measurements, TDOA measurements, and AOA measurements.

The exemplary sensor location software module 310 also comprises a beacon software module 430 As previously described, wireless sensor location controller 250 can send out a unique beacon signal to assist in the location of the wireless sensor 100. The exemplary sensor location software module 310 also comprises an "alert" software module 440. As previously described, the wireless sensor location controller 250 can send an "alert" signal to the wireless sensor base station 130 when a particular event occurs with respect to the wireless sensor 100.

It is understood that an exemplary embodiment of the invention may comprise one or more of the software modules that are contained in the exemplary sensor location module 310.

Figure 5:
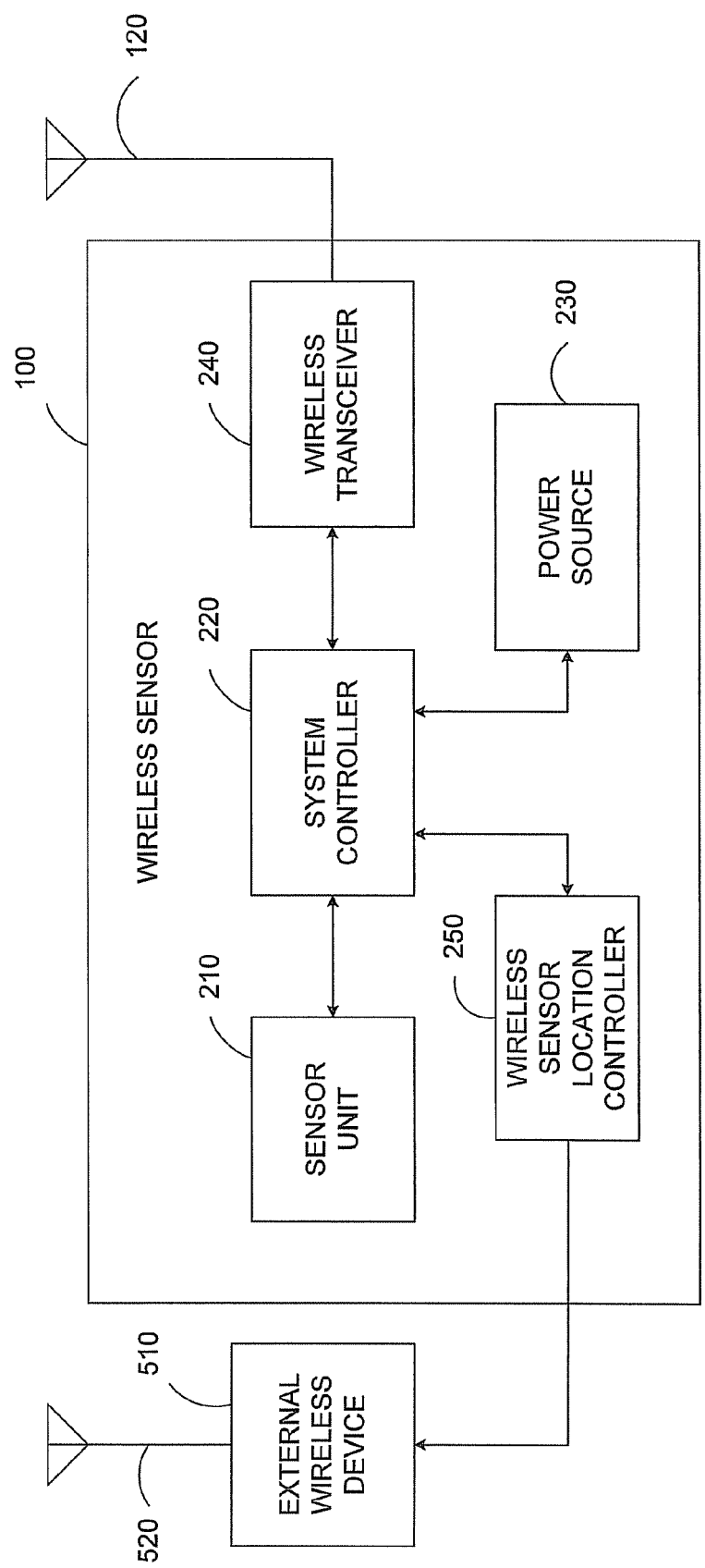
FIG. 5 illustrates a block diagram showing an exemplary wireless sensor location controller of the present invention operating in conjunction with a hand held wireless device.

FIG. 5 illustrates a block diagram showing an exemplary wireless sensor location controller 250 of the wireless sensor 100 operating in conjunction with a hand held wireless device 510. In this exemplary embodiment of the invention the wireless sensor location controller 250 provides the location information of the wireless sensor 100 to an external wireless device 510. The external wireless device 510 then transmits the location information of the wireless sensor 100 through antenna 520 to the wireless sensor base station 130. The external wireless device 510 may comprise a hand held wireless device.

Figure 6:
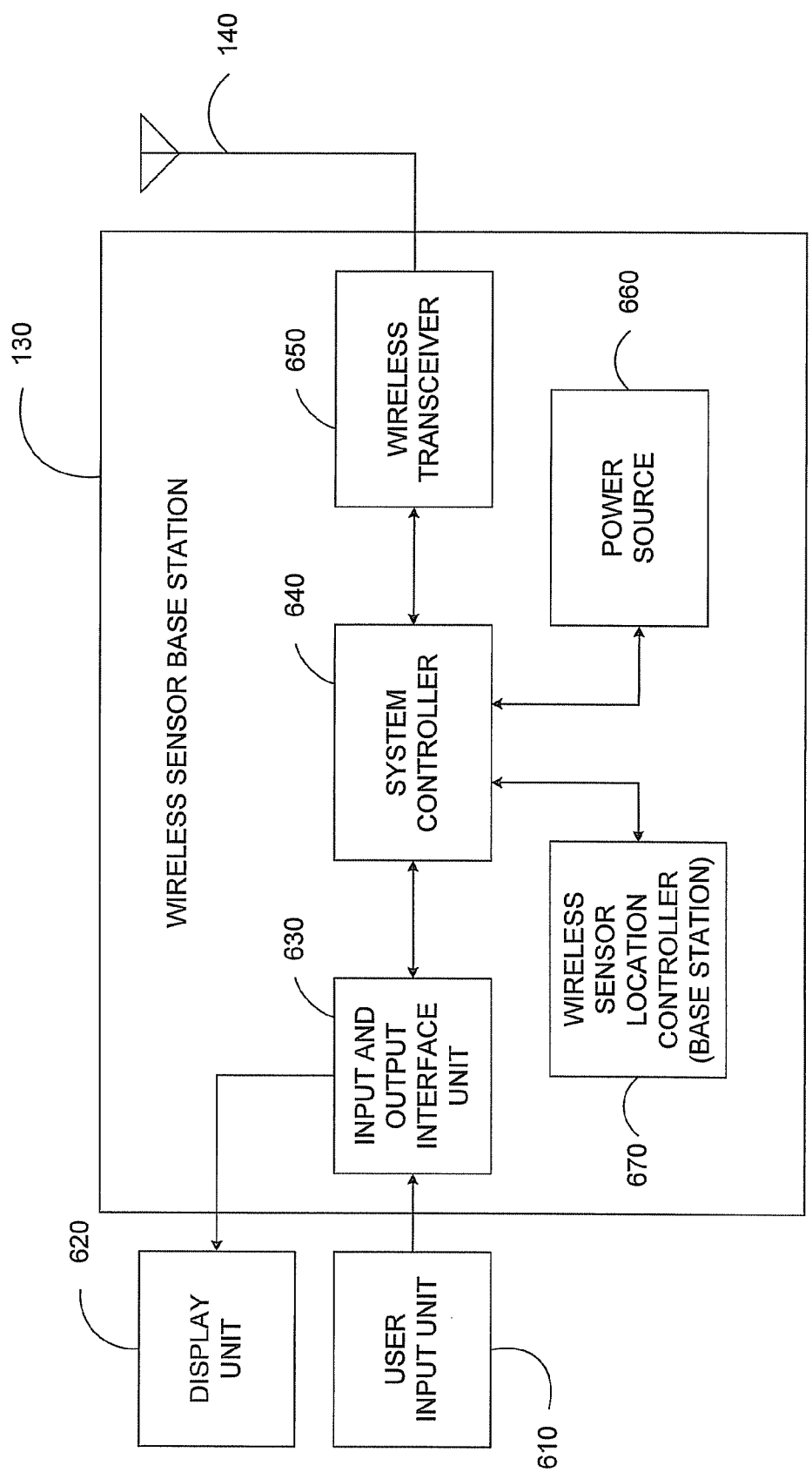
FIG. 6 illustrates a block diagram of an exemplary wireless sensor base station of the present invention.

FIG. 6 illustrates a block diagram of an exemplary wireless sensor base station 130 of the present invention. The wireless sensor base station 130 receives communications from (and sends communications to) the wireless sensor 100. The wireless sensor base station 130 comprises a user input unit 610, a display unit 620, an input and output interface unit 630, a system controller 640, a wireless transceiver 650, a power source 660, and a wireless sensor location controller (base station) 670.

A user can input instructions and control commands to the wireless sensor base station 130 through the user input unit 610. The user input unit 610 may comprise a computer (not shown in FIG. 6) with a keyboard and a mouse. The user input from the user input unit 610 passes through an input and output interface unit 630 to the system controller 640.

A user can also receive information from the wireless sensor base station 130 through the display unit 620. Display unit 620 may comprise any suitable display means such as a computer monitor (not shown in FIG. 6). In particular, the user can receive information on the display unit 620 that the wireless sensor base station 130 has received from the wireless sensor 100.

The system controller 640 is connected to a wireless transceiver 650. The wireless transceiver 650 is connected to an external antenna 140. The system controller 640 provides digital signals to the wireless transceiver 650 for transmission over antenna 140.

The system controller 640 receives power from a power source 660. The power source 660 can receive power from a battery power source (not shown in FIG. 6) or can receive power from another external power source (not shown in FIG. 6).

The wireless sensor base station 130 also comprises a wireless sensor location controller (base station) 670. As will be described below, the wireless sensor location controller (base station) 670 receives the location information of the wireless sensor 100 and displays the location information of the wireless sensor 100 on the display unit 620.

The wireless sensor base station 130 manages and keeps track of a plurality of wireless sensors (of which wireless sensor 100 is just one of the plurality of wireless sensors). As each of the wireless sensors sends its own particular location information to the wireless sensor base station 130, the wireless sensor location controller (base station) 670 receives and stores the location information in a database 810 (shown in FIG. 8). Each individual value of location information of each wireless sensor is continually updated in the database 810 as the wireless sensor base station 130 receives new location information.

The wireless sensor location controller (base station) 670 receives and processes GPS location data for the wireless sensor 100 (and for all of the other wireless sensors in the wireless sensor network). The GPS location data is continually updated as the various wireless sensors move about in the wireless sensor network.

In one advantageous embodiment of the present invention the wireless sensor location controller (base station) 670 performs the calculations for the signal strength method/TDOA method/AOA method and uses the calculations to locate the wireless sensor 100.

The wireless sensor location controller (base station) 670 also receives and processes the unique beacon signals from each of the plurality of wireless sensors. As previously mentioned, the wireless sensor location controller (base station) 670 of the wireless sensor base station 130 can send a request for a particular wireless sensor to activate its beacon signal. Alternatively, the beacons signals of the plurality of wireless sensors may be sequentially activated according to a predetermined schedule.

The wireless sensor location controller (base station) 670 also receives and processes the "alert" signals from each of the plurality of wireless sensors. The wireless sensor location controller (base station) 670 takes an appropriate action depending upon the nature of the occurrence that cause the "alert" signal to be sent.

The wireless sensor location controller (base station) 670 also displays on the display unit 620 location information for each of the plurality of wireless sensors in the wireless sensor network. Alarm conditions and "alert" signals that are associated with the wireless sensors will include the appropriate location information to help expedite the resolution of problem conditions. Location information may be used for system management tasks, such as identifying sources of interference or general areas of poor performance.

The wireless sensor location controller (base station) 670 is shown in FIG. 6 as a device that is separate from the system controller 640. In another embodiment of the invention, the wireless sensor location controller (base station) may be located within the system controller 640.

The wireless sensor location information may also be displayed in a manner that focuses on the commissioning process for the wireless sensors. For example, the installation of a wireless sensor at an intended location can be verified by confirming the location information. Similarly, the locations of wireless sensor can be confirmed for the grouping of wireless sensors for maintenance.

Figure 7:
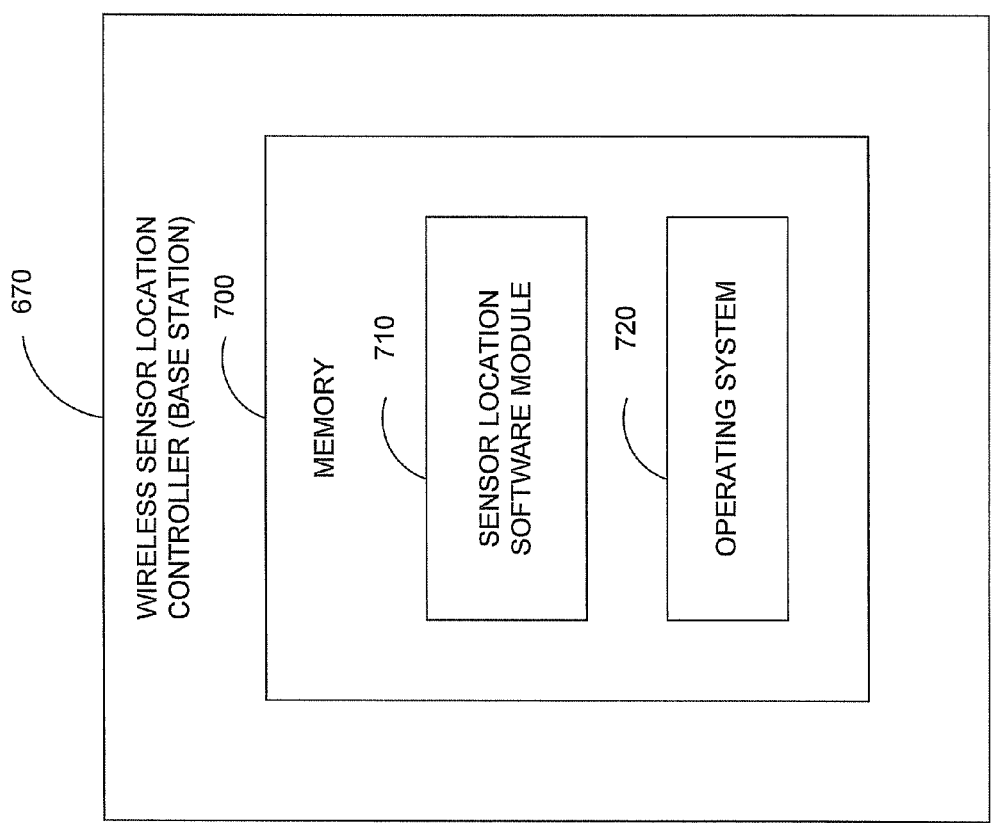
FIG. 7 illustrates a block diagram showing an exemplary wireless sensor location controller of a wireless sensor base station of the present invention.

FIG. 7 illustrates a block diagram showing an exemplary wireless sensor location controller (base station) 670 in a wireless sensor base station 130 of the present invention. The wireless sensor location controller (base station) 670 comprises a computer memory unit 700. The computer memory unit 700 comprises a sensor location software module 710 and an operating system 720. The wireless sensor location controller (base station) 670 comprises computer hardware and computer software instructions that cooperate and work together to carry out the operations of the wireless sensor location controller (base station) 670. As previously mentioned, in one exemplary embodiment of the invention, the wireless sensor location controller (base station) may be located within the system controller 640.

Figure 8:
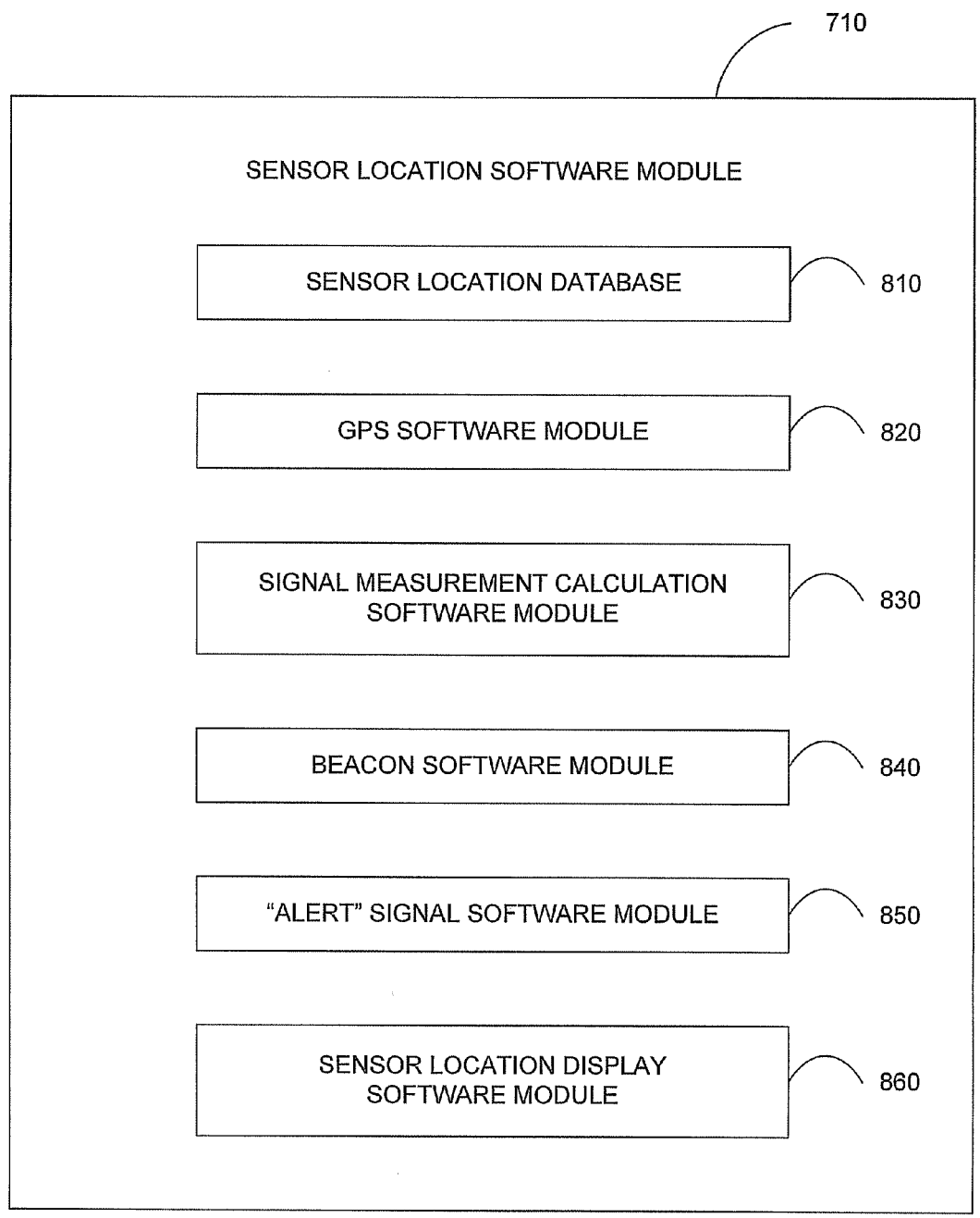
FIG. 8 illustrates a block diagram showing an exemplary sensor location software module of the wireless sensor location controller of the wireless sensor base station of the present invention.

FIG. 8 illustrates a block diagram showing an exemplary sensor location software module 710 of the wireless sensor location controller (base station) 670. The exemplary sensor location software module 710 comprises a sensor location database 810. The function of the sensor location database 810 has been previously described.

The exemplary sensor location software module 710 also comprises a Global Positioning System ("GPS") software module 820. The wireless sensor location controller (base station) 670 processes GPS measurements that locate the wireless sensor 100. The exemplary sensor location software module 710 also comprises a signal measurement calculation software module 830. The wireless sensor location controller (base station) 670 can use the signal measurement calculation software module 830 to perform the calculations required for locating the wireless sensor 100 using signal strength measurements, TDOA measurements, and AOA measurements.

The exemplary sensor location software module 710 also comprises a beacon software module 840 As previously described, wireless sensor location controller (base station) 670 can cause a wireless sensor 100 to send out a unique beacon signal to assist in the location of the wireless sensor 100. The exemplary sensor location software module 710 also comprises an "alert" software module 850. The wireless sensor location controller (base station) 670 can receive and process an "alert" signal from a wireless sensor 100.

The exemplary sensor location software module 710 also comprises a sensor location display software module 860. The sensor location display software module 860 displays the sensor location information on the display unit 620 in the manner previously described.

Figure 9:
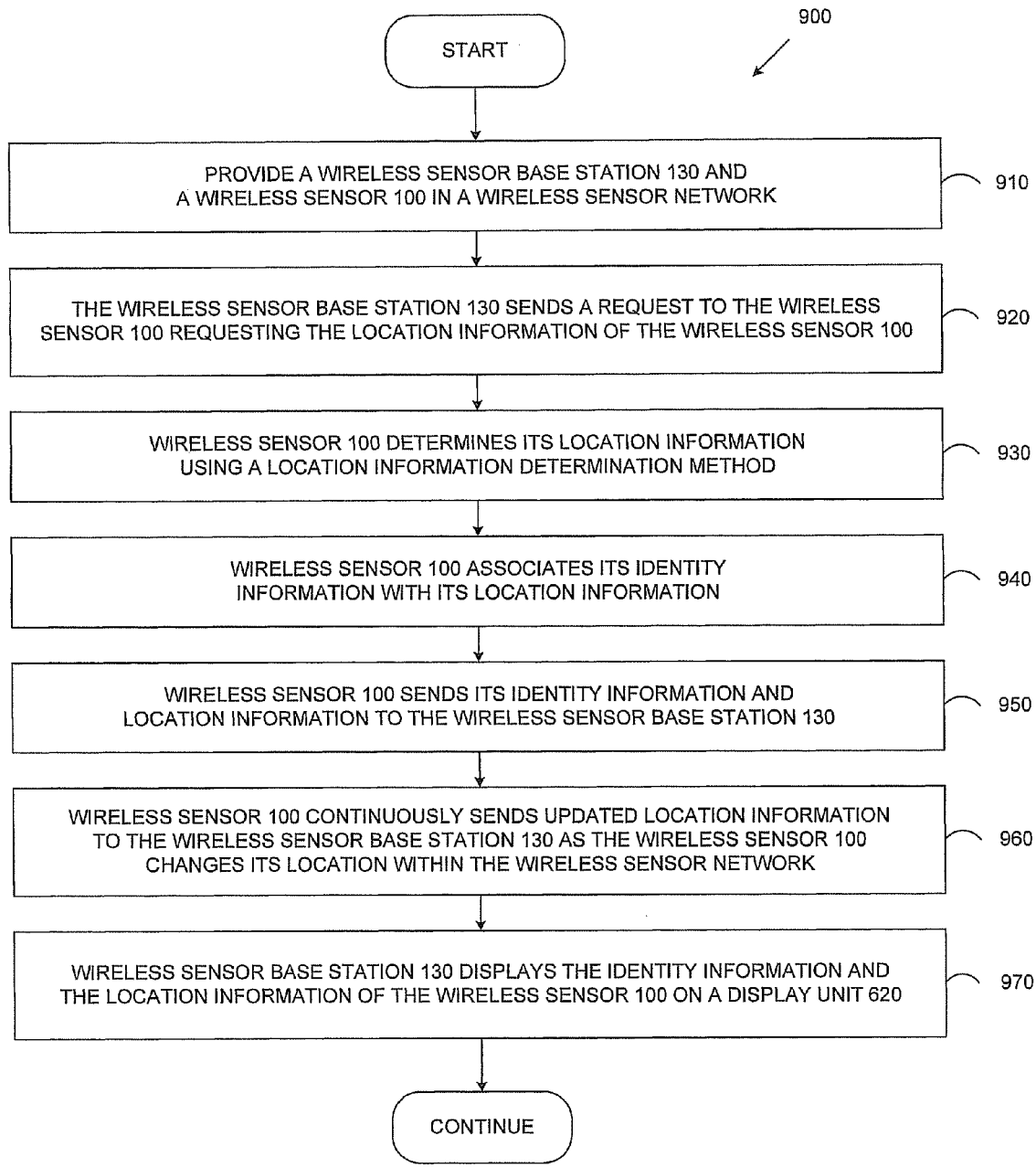
FIG. 9 illustrates a flow chart showing the steps of an advantageous embodiment of a method of the present invention.

FIG. 9 illustrates a flow chart 900 showing the steps of an advantageous embodiment of a method of the present invention. In the first step a wireless sensor base station 130 and a wireless sensor 100 in a wireless sensor network are provided (step 910). The wireless sensor base station 130 sends a request to the wireless sensor 100 requesting the location information of the wireless sensor 100 (step 920).

Then the wireless sensor 100 determines its location information using a location information determination method (step 930). Then the wireless sensor 100 associates its identity information with its location information (step 940). Then the wireless sensor 100 sends its identity information and location information to the wireless sensor base station 130 (step 950).

The wireless sensor 100 continuously sends updated location information to the wireless sensor base station 130 as the wireless sensor 100 changes its location within the wireless sensor network (step 960). The wireless sensor base station 130 then displays the identity information and the location information of the wireless sensor 100 on a display unit 260 (step 970).

Figure 10:
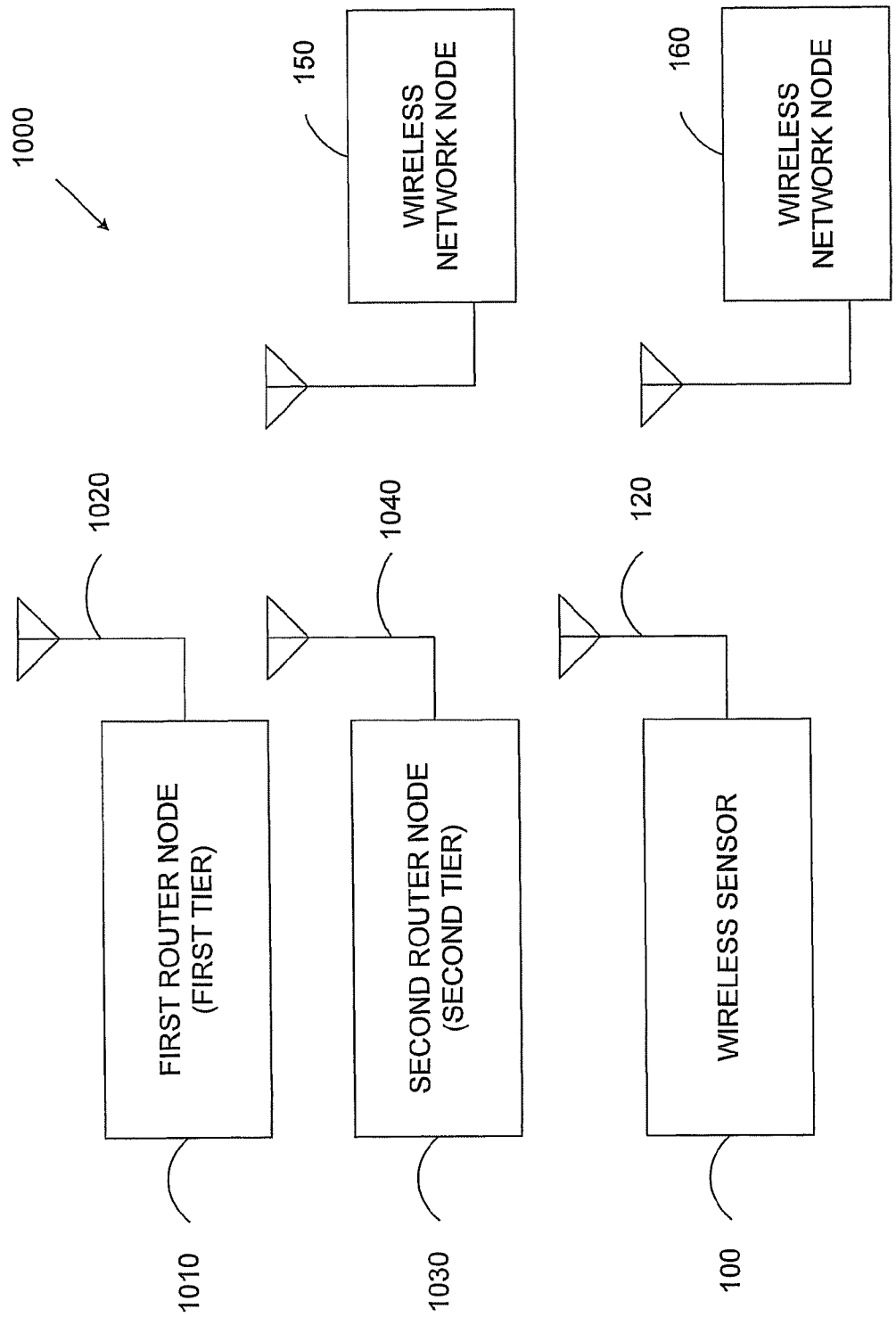
FIG. 10 illustrates a block diagram showing a multi-tier wireless communication system operating in conjunction with an exemplary sensor location of the present invention.

The present invention may also be employed within a multi-tier wireless communication network. FIG. 10 illustrates a block diagram showing a multi-tier wireless communication network 1000 that operates in conjunction with an exemplary sensor location 100 of the present invention. The multi-tier wireless communication network 1000 comprises a first router node (first tier) 1010 that wirelessly communicates with other elements of the network 1000 via antenna 1020. The multi-tier wireless communication network 1000 also comprises a second router node (second tier) 1030 that wirelessly communicates with other elements of the network 1000 via antenna 1040. The network 1000 also comprises wireless nodes 150 and 160.

In one advantageous embodiment of the invention, the elements of the present invention that have been described as being located in the wireless sensor base station 130 (e.g., display unit 620, user input unit 610, wireless sensor location controller (base station) 670) may be located in other locations. That is, actual location of the elements may be distributed throughout the network 1000. For example, the user interface elements could be located within the first router node (first tier) 1010 while the location determination elements could be located within the second router node (second tier) 1030 of the network 1000. Also, the control function elements could be located separately with respect to the base radio functions of the invention. Also, the location of the wireless sensor 100 may be separately determined by the network 1000.

Figure 11:
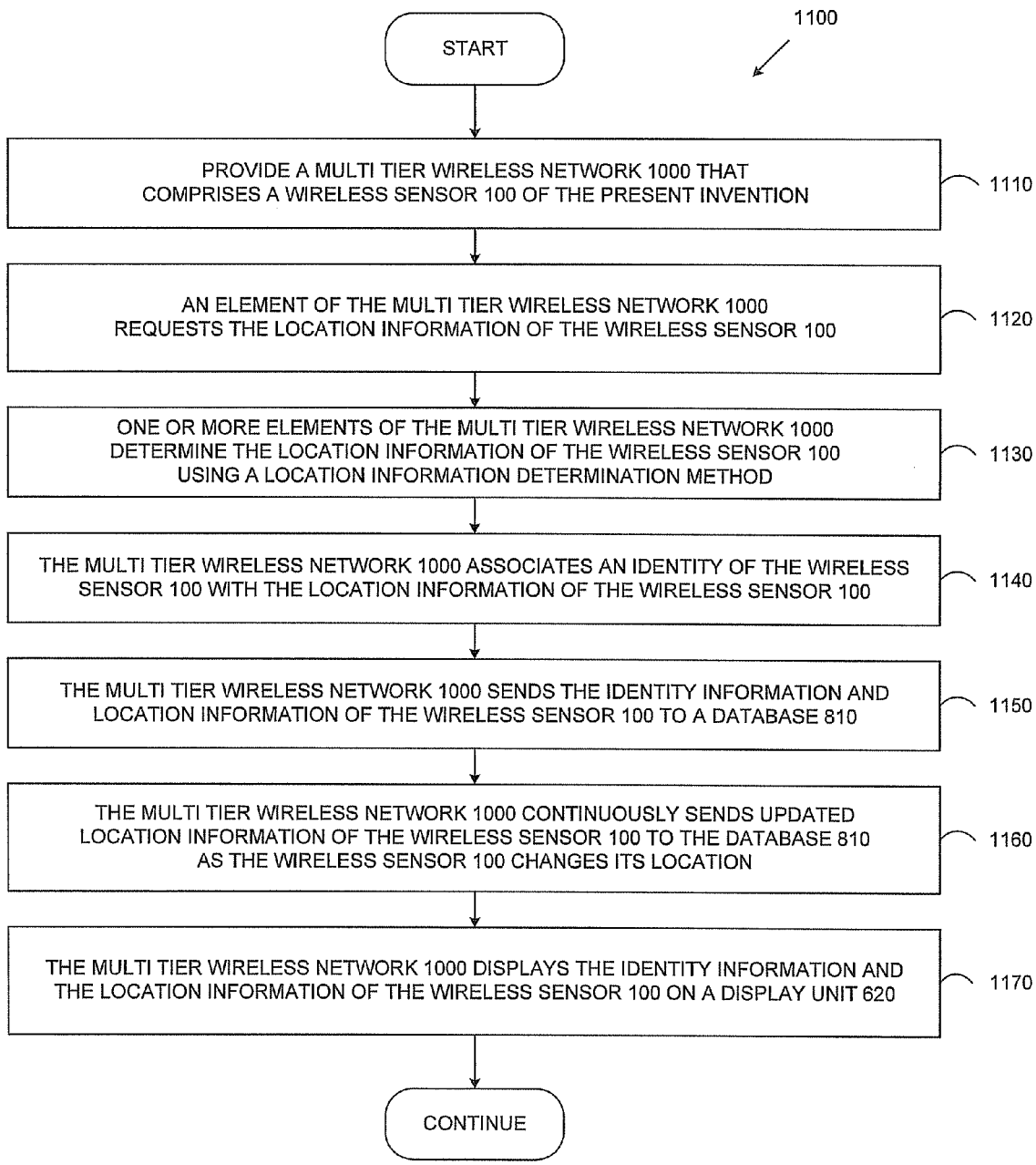
FIG. 11 illustrates a flow chart showing the steps of another advantageous embodiment of a method of the present invention.

FIG. 11 illustrates a flow chart 1100 showing the steps of another advantageous embodiment of a method of the present invention. In the first step a multi tier wireless network 1000 is provided that comprises a wireless sensor 100 of the present invention (step 1110). An element of the multi tier wireless network 1000 (e.g., first router node (first tier) 1010) requests the location of the wireless sensor 100 (step 1120).

Then one or more elements of the multi tier wireless network 1000 (e.g., second router node (second tier) 1030) determine the location information of the wireless sensor 100 using a location information determination method (step 1130). The multi tier wireless network 1000 then associates an identity of the wireless sensor with the location information of the wireless sensor 100 (step 1140). The multi tier wireless network 1000 then sends the identity information and the location information of the wireless sensor 100 to a database 810 that is located within the multi tier wireless network 1000 (step 1150).

The multi tier wireless network 1000 continuously sends updated location information of the wireless sensor 100 to the database 810 as the wireless sensor 100 changes its location (step 1160). The multi tier wireless network 1000 displays the identity information and the location information of the wireless sensor 100 on a display unit 620 that is located within one of the elements of the multi tier wireless network 1000 (e.g., within the first router node (first tier) 1010) (step 1170).

It may be advantageous to set forth definitions of certain words and phrases used throughout this patent document. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another.

The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A wireless sensor comprising:
   a wireless sensor location controller configured to:
      determine a location of the wireless sensor,
      detect a geographic boundary,
      detect movement of the wireless sensor, and
      control a wireless transceiver to wirelessly transmit a signal comprising location information of the wireless sensor in response to (i) detecting the movement of the wireless sensor and (ii) determining that the wireless sensor has passed the geographic boundary,
   wherein the wireless sensor location controller is further configured to determine a velocity of the wireless sensor in response to detecting the movement of the wireless sensor and control the wireless transceiver to wirelessly transmit the signal in response to determining that the velocity of the wireless sensor is greater than a threshold velocity.

2. The wireless sensor as set forth in claim 1, wherein the wireless sensor location controller is configured to determine the location of the wireless sensor in response to a request from a wireless sensor base station.

3. The wireless sensor as set forth in claim 1, wherein the wireless sensor location controller is further configured to include identity information of the wireless sensor in association with the location information of the wireless sensor in the signal.

4. The wireless sensor as set forth in claim 1, wherein:
   the wireless sensor location controller is configured to determine the location of the wireless sensor in response to a request from a wireless sensor base station; and
   the wireless sensor location controller is further configured to include identity information of the wireless sensor in association with the location information of the wireless sensor in the signal.

5. The wireless sensor as set forth in claim 1, wherein the wireless sensor location controller is further configured to provide the location information of the wireless sensor to an external wireless device.

6. The wireless sensor as set forth in claim 1, wherein the wireless sensor location controller is configured to determine the location of the wireless sensor using one of: global positioning system (GPS) technology, time difference of arrival (TDOA) signal measurement technology, angle of arrival (AOA) signal measurement technology, and signal strength measurements of one of: a signal that is transmitted by the wireless sensor and a signal that is received by the wireless sensor.

7. The wireless sensor as set forth in claim 1, wherein the wireless sensor location controller is configured to generate the signal as a beacon signal that uniquely identifies the wireless sensor.

8. The wireless sensor as set forth in claim 1, wherein the wireless sensor location controller is configured to generate the signal as an alert signal that signifies an event of interest has occurred with respect to the wireless sensor.

9. A wireless sensor network comprising:
   at least one wireless sensor comprising a wireless sensor location controller and a wireless transceiver, the wireless sensor location controller configured to:
      determine a location of the at least one wireless sensor,
      detect a geographic boundary,
      detect movement of the at least one wireless sensor, and
      control the wireless transceiver to wirelessly transmit a signal comprising location information of the at least one wireless sensor in response to (i) detecting the movement of the at least one wireless sensor and (ii) determining that the at least one wireless sensor has passed the geographic boundary,
   wherein the wireless sensor location controller is further configured to determine a velocity of the at least one wireless sensor in response to detecting the movement of the at least one wireless sensor and control the wireless transceiver to wirelessly transmit the signal in response to determining that the velocity of the at least one wireless sensor is greater than a threshold velocity; and
   a wireless sensor base station configured to communicate with the at least one wireless sensor.

10. The wireless sensor network as set forth in claim 9, wherein the wireless sensor location controller is configured to determine the location of the at least one wireless sensor in response to receiving a request from the wireless sensor base station.

11. The wireless sensor network as set forth in claim 9, wherein:
   the wireless sensor location controller is configured to determine the location of the at least one wireless sensor in response to a request from the wireless sensor base station; and
   the wireless sensor location controller is further configured to include identity information of the at least one wireless sensor in association with the location information of the at least one wireless sensor in the signal.

12. The wireless sensor network as set forth in claim 9, wherein the wireless sensor location controller is configured to determine the location of the at least one wireless sensor using one of: global positioning system (GPS) technology, time difference of arrival (TDOA) signal measurement technology, angle of arrival (AOA) signal measurement technology, and signal strength measurements of one of: a signal that is transmitted by the at least one wireless sensor and a signal that is received by the at least one wireless sensor.

13. The wireless sensor network as set forth in claim 9, wherein the wireless sensor base station comprises a second wireless sensor location controller and a database including location information for each wireless sensor in the wireless sensor network.

14. The wireless sensor network as set forth in claim 9, wherein the wireless sensor base station comprises a second wireless sensor location controller configured to display, on a display unit of the wireless sensor base station, location information for each wireless sensor in the wireless sensor network and to verify an installation location for each wireless sensor in the wireless sensor network based on the location information.

15. A wireless sensor network that comprises:
   at least one wireless sensor;
   a wireless transceiver; and
   a wireless sensor location controller configured to:
      determine a location of the at least one wireless sensor,
      detect a geographic boundary,
      detect movement of the at least one wireless sensor, and
      control the wireless transceiver to wirelessly transmit a signal comprising location information of the at least one wireless sensor in response to (i) detecting the movement of the at least one wireless sensor and (ii) determining that the at least one wireless sensor has passed the geographic boundary,
   wherein the wireless sensor location controller is further configured to determine a velocity of the at least one wireless sensor in response to detecting the movement of the at least one wireless sensor and control the wireless transceiver to wirelessly transmit the signal in response to determining that the velocity of the at least one wireless sensor is greater than a threshold velocity.

16. The wireless sensor network as set forth in claim 15, wherein the wireless sensor location controller is configured to determine the location of the at least one wireless sensor using one of: global positioning system (GPS) technology, time difference of arrival (TDOA) signal measurement technology, angle of arrival (AOA) signal measurement technology, and signal strength measurements of one of: a signal that is transmitted by the at least one wireless sensor and a signal that is received by the at least one wireless sensor.

17. The wireless sensor network as set forth in claim 16, wherein the wireless sensor network is a multi-tier wireless sensor network that comprises a plurality of multi-tier wireless network elements.

18. A method for operating a wireless sensor network, the method comprising:
   providing at least one wireless sensor comprising a wireless sensor location controller;
   determining a location of the at least one wireless sensor;
   detecting a geographic boundary;
   detecting movement of the at least one wireless sensor;
   determining a velocity of the at least one wireless sensor in response to detecting the movement of the at least one wireless sensor;
   in response to (i) detecting the movement of the at least one wireless sensor and (ii) determining that the at least one wireless sensor has passed the geographic boundary, transmitting a signal comprising location information of the at least one wireless sensor for delivery to a wireless sensor base station; and
   in response to determining that the velocity of the at least one wireless sensor is greater than a threshold velocity, wirelessly transmitting the signal.

19. The method as set forth in claim 18, further comprising:
   receiving a request from the wireless sensor base station at the at least one wireless sensor to obtain the location information of the at least one wireless sensor;
   in response to the request from the wireless sensor base station, determining the location of the at least one wireless sensor; and
   transmitting the location information of the at least one wireless sensor for delivery to the wireless sensor base station.

20. The method as set forth in claim 18, wherein determining the location of the at least one wireless sensor comprises:
   determining the location of the at least one wireless sensor using one of: global positioning system (GPS) technology, time difference of arrival (TDOA) signal measurement technology, angle of arrival (AOA) signal measurement technology, and signal strength measurements of one of: a signal that is transmitted by the at least one wireless sensor and a signal that is received by the at least one wireless sensor.

21. The method as set forth in claim 18, further comprising:
   in response to determining that the velocity of the at least one wireless sensor is greater than the threshold velocity, determining new location information of the at least one wireless sensor; and
   transmitting the new location information of the at least one wireless sensor for delivery to the wireless sensor base station.

22. The method as set forth in claim 18, further comprising: in response to an occurrence of an event of interest with respect to the at least one wireless sensor, generating an alert signal in the wireless sensor location controller of the at least one wireless sensor; and
   transmitting the alert signal for delivery to the wireless sensor base station.

23. The method as set forth in claim 18, further comprising:
   sending the location information for the at least one wireless sensor to the wireless sensor base station;
   recording the location information of the at least one wireless sensor in a database in the wireless sensor base station; and
   displaying the location information of the at least one wireless sensor on a display unit of the wireless sensor base station.

24. The wireless sensor network as set forth in claim 15, wherein:
   the wireless sensor location controller is configured to determine the location of the at least one wireless sensor in response to a request from a wireless sensor base station; and
   the wireless sensor location controller is further configured to include identity information of the at least one wireless sensor in association with the location information of the at least one wireless sensor in the signal.

* * * * *